United States Patent
Prud'Homme-Lacroix et al.

(10) Patent No.: US 9,315,262 B2
(45) Date of Patent: Apr. 19, 2016

(54) SKID LANDING GEAR HAVING AT LEAST ONE CROSS-MEMBER WITH ROCKERS, AND AN AIRCRAFT

(71) Applicant: AIRBUS HELICOPTERS, Marignane (FR)

(72) Inventors: Pierre Prud'Homme-Lacroix, Vitrolles (FR); Remy-Elian Arnaud, Vitrolles (FR); Brice Makinadjian, Ventabren (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 14/557,958

(22) Filed: Dec. 2, 2014

(65) Prior Publication Data

US 2015/0151836 A1 Jun. 4, 2015

(30) Foreign Application Priority Data

Dec. 2, 2013 (FR) ...................................... 13 02796

(51) Int. Cl.
*B64C 25/52* (2006.01)
*B64C 25/58* (2006.01)
*B64C 25/32* (2006.01)

(52) U.S. Cl.
CPC ................. *B64C 25/52* (2013.01); *B64C 25/58* (2013.01); *B64C 2025/325* (2013.01)

(58) Field of Classification Search
CPC .... B64C 25/52; B64C 25/58; B64C 2025/325
See application file for complete search history.

(56) References Cited

U.S. PATENT DOCUMENTS

| 2,479,976 | A | * | 8/1949 | Shultz | B64C 25/06 244/104 LS |
| 3,173,632 | A | | 3/1965 | Woods | |
| 4,270,711 | A | * | 6/1981 | Cresap | B64C 25/52 244/100 R |
| 4,519,559 | A | | 5/1985 | Logan et al. | |
| 4,645,143 | A | * | 2/1987 | Coffy | B64C 25/52 244/100 R |
| 6,244,538 | B1 | | 6/2001 | Howard et al. | |
| 7,770,843 | B2 | | 8/2010 | Bietenhader | |
| 9,085,361 | B2 | * | 7/2015 | Prud'Homme-Lacroix | B64C 25/52 |

FOREIGN PATENT DOCUMENTS

FR 2554210 5/1985
FR 2895368 6/2007

OTHER PUBLICATIONS

French Search Report for FR 1302796, Completed by the French Patent Office on Aug. 11, 2014, 6 Pages.

* cited by examiner

*Primary Examiner* — Tien Dinh
*Assistant Examiner* — Richard R Green
(74) *Attorney, Agent, or Firm* — Brooks Kushman P.C.

(57) ABSTRACT

The present invention relates to landing gear having a first skid, a second skid, a front cross-member, and a rear cross-member. The landing gear includes at least one stiffener arranged on a cross-member, said stiffener having two rockers each extending from an outer end secured to the cross-member, two hinge means for hinging each rocker to a carrier structure, and an elongate link member extending between a first link end hinged to the first rocker to a second link end hinged to the second rocker.

18 Claims, 3 Drawing Sheets

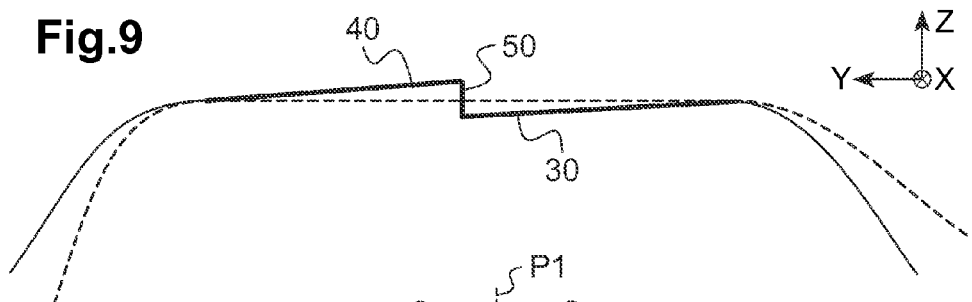
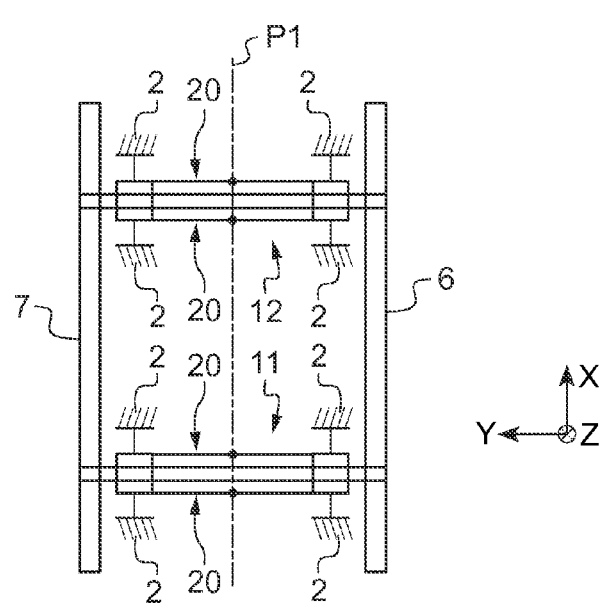
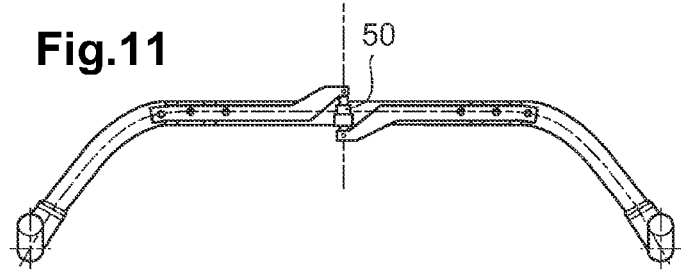
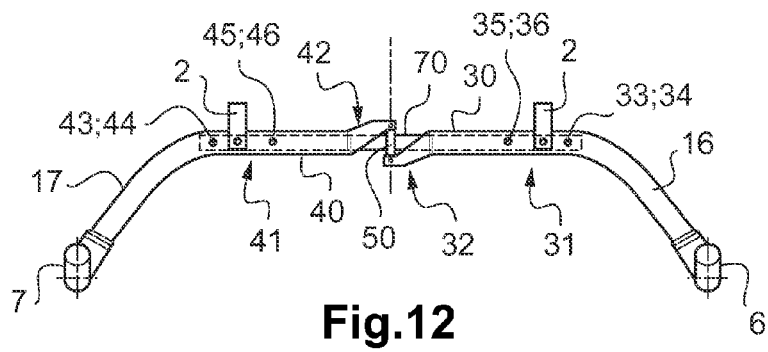

SKID LANDING GEAR HAVING AT LEAST ONE CROSS-MEMBER WITH ROCKERS, AND AN AIRCRAFT

CROSS REFERENCE TO RELATED APPLICATION

This application claims priority to French patent application No. FR 13 02796 filed on Dec. 2, 2013, the disclosure of which is incorporated in its entirety by reference herein.

BACKGROUND OF THE INVENTION (1) Field of the Invention

The present invention relates to skid landing gear having at least one cross-member with rockers, and to an aircraft including the landing gear. More precisely, the invention lies in the technical field of skid landing gear for rotorcraft.

(2) Description of Related Art

Conventionally, a rotorcraft has landing gear on which the rotorcraft stands when on the ground. More particularly, the various kinds of landing gear include "skid landing gear" having first and second longitudinally-extending load-bearing skids. The skids are for coming into contact with the ground and they are arranged on either side of the fuselage of the rotorcraft. The first and second longitudinally-extending load-bearing skids together define a plane referred to for convenience as the "bearing plane".

The aircraft then stands on the ground via two elongate skids.

In order to connect each skid to the fuselage of the aircraft, the skid landing gear may be provided with first and second transverse cross-members, each cross-member connecting the first skid to the second skid.

The first cross-member is referred to as the "front" cross-member since it connects the fuselage to zones situated near the front of the first longitudinally-extending skid and near the front of the second longitudinally-extending skid. Conversely, the second cross-member is referred to as the "rear" cross-member insofar as it connects the fuselage to zones situated towards the rear of the first and second longitudinally-extending skids.

The landing gear is then fastened to the aircraft via its front and rear cross-members.

Such landing gear enables rotorcraft to land on surfaces of multiple types.

Furthermore, rotorcraft landing gear may be subjected mainly to two types of loading while landing, namely vertical loading associated with vertical moments and forces directed in a vertical direction, and roll loading associated with roll moments and forces resulting from roll movement of the rotorcraft.

Such loading in roll (and in pitching) may give rise to a phenomenon of ground resonance on a rotorcraft having a lift rotor with at least three hinge blades.

The oscillations of each blade about its lead/lag axis can become coupled in unstable manner with movements of the rotorcraft fuselage in elastic deformation mode, in particular relating to roll of the landing gear: this is the origin of the phenomenon known as "ground resonance".

While they rotate, the blades are moved away from their equilibrium positions in the plane of rotation of the rotor, and can become angularly distributed in unequal manner relative to the axis of rotation of the rotor. This unequal distribution gives rise to unbalance by moving the center of gravity of the rotor away from the axis of rotation of the rotor. Furthermore, blades that are spaced away from their equilibrium positions oscillate about those equilibrium positions at an oscillation frequency $\omega_\delta$, which is the lead/lag natural frequency of the blades.

If $\Omega$ is the frequency of rotation of the rotor, the fuselage of the rotorcraft is thus excited at the frequencies $|\Omega \pm \omega_\delta|$.

When standing on the ground via landing gear, the fuselage of the rotorcraft can be considered as constituting a mass system held above the ground by a spring and a damper via the downwardly-directed branches of the cross-members. The fuselage standing on the landing gear is thus characterized by natural modes of vibration in roll and in pitching. There is thus a risk of instability on the ground when the natural frequency of the fuselage on its landing gear in roll or in pitching comes close to the natural frequency of oscillation $|\Omega+\omega_\delta|$ or $|\Omega-\omega_\delta|$, which corresponds to the phenomenon known as ground resonance. In practice, it is generally found that instability in roll can occur if the natural frequency of the fuselage on its landing gear is close to $|\Omega-\omega_\delta|$.

In order to avoid instability, it is known in particular to seek to avoid these frequencies crossing each other by adapting the roll and/or pitching stiffness of the landing gear.

Nevertheless, adapting landing gear can be difficult. A compromise needs to be found in particular between firstly the vertical stiffness of the landing gear, which governs comfort and the level of load introduced into the structure while landing, and secondly the stiffnesses in pitching and/or roll, which have strong influence on ground resonance behavior.

It should be recalled that the person skilled in the art uses the term "vertical stiffness" to designate the stiffness of the landing gear under the effect of gravity (or any other vertical loading) along the elevation axis of the aircraft, ignoring static trim.

Developing skid landing gear is thus generally a lengthy and difficult procedure. This development is therefore rarely called into question during the lifetime of the aircraft.

Nevertheless, substantial modifications may be made to an aircraft during its lifetime, and may for example give rise to an increase in the weight of the aircraft. The natural frequencies of the fuselage in roll and/or in pitching may therefore change, and that can run the risk of causing the ground resonance phenomenon to appear.

Under such circumstances, a manufacturer may be tempted to modify the stiffnesses of the landing gear in roll and/or pitching without having too much effect on the behavior of the aircraft, in particular while landing.

To that end, geometrical modifications may be made to skid landing gear. Nevertheless, such geometrical modifications may suffer the drawback of changing the vertical stiffness of the landing gear. This can then have an impact in particular on the behavior of the landing gear while landing.

Another known solution is based on mechanisms.

Thus, landing gear may include cross-members fastened to a fuselage. The landing gear may also present a stiffener including at least one link and at least one means for limiting deformation in roll of the central portion of a cross-member, each such limitation means being secured to the central portion of the cross-member, at least one main hinge connecting each link to the limitation means and a secondary hinge connecting each connection rod to a point external to the central portion in order to limit the deformation of the central portion as a result of movement in roll of an aircraft.

That landing gear thus suggests fastening a cross-member directly to a fuselage and using mechanisms for optimizing its deformation in roll.

Document FR 2 554 210 describes a flexible beam made of composite materials having substantially the form of an elongate box girder of stratified structure. Two rigid soleplates are connected together by two webs.

A deformable energy-absorber pad is arranged between the two soleplates and includes at least one block of elastomer material having strong deformation remanance.

The beam also has at least one viscoelastic damper mounted on the outside face of the soleplate. That damper is loaded in traction by the link during deformation in bending of the beam so as to produce damping that is additional to the damping provided by each energy-absorber pad.

That configuration suggests using an elastomer within a cross-member and within a damper fastened under the cross-member. That configuration is remote from the invention and has little influence on the positioning of the natural frequencies of the fuselage in roll or in pitching relative to the natural oscillation frequencies $|\Omega+\omega_\delta|$ or $|\Omega-\omega_\delta|$.

Document U.S. Pat. No. 4,270,711 describes landing gear provided with a beam connected by a pivot to the cross-member of the landing gear so as to be capable of pivoting about an axis. The ends of the beam are then fastened to the structure of an aircraft.

That teaching serves in particular to fasten landing gear having three fastener points to a structure that has four fastener points.

That teaching thus requires four fastener points to be provided on the fuselage.

Document U.S. Pat. No. 6,244,538 describes landing gear.

That document enables the natural frequencies of the fuselage in roll and in pitching to be located relative to the natural oscillation frequencies $|\Omega+\omega_\delta|$ or $|\Omega-\omega_\delta|$ as a function of the spreading point of supporting links.

Document U.S. Pat. No. 3,173,632 describes landing gear having two skids connected to two torsion rods. Each torsion rod is secured to two arms, each arm being hinged to an upright extending in elevation from a skid.

Furthermore, movement-preventing means may allow or prevent each torsion rod to twist about its own axis of symmetry.

Also known are Document U.S. Pat. No. 4,519,559 and Document FR 2 895 368.

BRIEF SUMMARY OF THE INVENTION

An object of the present invention is thus to provide landing gear provided with a stiffener, and an aircraft including such landing gear.

This aircraft landing gear is provided with a longitudinally-extending load-bearing first skid and a longitudinally-extending load-bearing second skid together with a cross-member referred to as a "front" cross-member and a cross-member referred to as a "rear" cross-member, each cross-member connecting the first skid to the second skid. Each cross-member has a first downwardly-directed branch secured to the first skid, and a second downwardly-directed branch secured to the second skid.

The cross-member may be a continuous cross-member having a central portion extending from a first lateral zone secured to the first downwardly-extending branch to a second lateral zone secured to the second downwardly-extending branch, and passing via a central zone.

The cross-member may also be a discontinuous cross-member that does not have a central portion, with a gap separating the first branch from the second branch.

Under such circumstances, the landing gear includes at least one stiffener arranged on a cross-member, the stiffener comprising in succession in a transverse direction:

a first rocker extending from an outer first end portion secured to the cross-member and going towards an inner first end portion that is free, and that is not secured to the cross-member; and a second rocker extending from an inner second end portion that is free and that is not secured to the cross-member towards an outer second end portion secured to the cross-member.

The stiffener also includes:

first hinge means for hinging the first rocker to a carrier structure of an aircraft, and second hinge means for hinging the second rocker to said carrier structure; and an elongate link member extending from a first link end hinged to said inner first end portion of the first rocker to a second link end hinged to said inner second end portion of the second rocker.

The stiffener then extends transversely in a direction going from the first skid towards the second skid. More precisely, the stiffener extends from the outer first end portion of the first rocker towards the outer second end portion of the second rocker, passing in succession via the inner first end portion, the elongate link member, and the inner second end portion.

Each rocker of a stiffener is secured to the cross-member via its outer end portion only. Furthermore, the hinge means give each rocker a degree of freedom to pivot about a hinge direction relative to a carrier structure of an aircraft fitted with the landing gear.

A cross-member fitted with a stiffener is then not fastened directly to a carrier structure of an aircraft, but is supported by two rockers. These two rockers are hinged firstly to the carrier structure and secondly they are hinged to a common elongate link member. The rockers then bear one against the other via the elongate link member.

In flight, the elongate link member may be contained substantially in the longitudinal antero-posterior plane of symmetry of the aircraft and of the landing gear. The elongate link member of a stiffener thus extends in flight in an elevation direction contained in that antero-posterior plane.

Surprisingly, such a stiffener serves to adjust the roll stiffness of landing gear while possibly having limited or even zero impact on the vertical stiffness of the same landing gear. This stiffness serves in particular to create two different paths for the forces that result from vertical loading on the landing gear and for the forces that result from roll loading on the landing gear.

The cross-member tends to deform differently depending on the way in which it is loaded.

The cross-member is loaded by a vertical first bending mode while landing, and by a roll second bending mode under roll loading, e.g. obtained from the ground.

For example, when the cross-member is a continuous cross-member having a central portion, the central portion presents a flat U-shape during the vertical first bending mode. The deformation of the central portion thus presents one deflection.

The rockers both perform pivot movements that are identical in modulus but opposite in sign and therefore they do not transmit any force to the elongate link member. The elongate link member tilts a little relative to the vertical. The impact of the stiffener on the vertical stiffness of the landing gear is thus limited, with the ability to withstand the bending moment being provided by the central portion of the cross-member in that zone.

In contrast, the central portion of a continuous cross-member tends to present an S-shape during the roll second bending mode. The deformation of its central portion thus presents two deflections of opposite signs that meet at a node.

The rockers then tend to perform pivoting movements in opposite directions, thereby causing the elongate link member to be loaded in traction or in compression. The elongate link member then tends to limit the pivoting movements of the rockers, and consequently to limit the deformation of the cross-member.

The forces that result from vertical loading on the landing gear thus tend to be withstood by the cross-member itself. Conversely, the forces that result from roll loading of the landing gear tend to be supported by the stiffener.

Consequently, the invention presents a stiffener that acts differently depending on the deformation of the cross-member, and more particularly depending on the deformation of its central portion connected to the structure of the aircraft, so as to act mainly on the roll stiffness of the landing gear.

As a result, the stiffener can give the ability to adjust the stiffness of the landing gear for the purpose of reducing the risk of the ground resonance phenomenon appearing.

The invention is also applicable to a discontinuous cross-member.

Furthermore, it can be understood that the invention can be implemented by fitting such a stiffener to existing landing gear, e.g. in order to adapt the landing gear to a new configuration of a rotorcraft. By way of example, after there has been an increase in the weight of the rotorcraft or a change to the lift rotor of the rotorcraft, it may be appropriate to implement a stiffener of the invention on the rotorcraft.

For example, the rockers may be positioned so that the first hinge means and the second hinge means of a stiffener are fastened to two existing fastener points of an aircraft.

The landing gear may also include one or more of the following characteristics.

Thus, each rocker may be longitudinally offset relative to the cross-member. A rocker is thus not arranged above or below a cross-member but is longitudinally beside the cross-member (i.e. in front of it or behind it). The term "longitudinally" refers to the antero-posterior plane along which the aircraft extends longitudinally.

Furthermore, each cross-member of landing gear may be fitted with at least one stiffener.

Thus, one or two cross-members may be fitted with at least one stiffener as a function of the phenomena encountered on a given aircraft.

Furthermore, at least one cross-member may be fitted with two stiffeners arranged longitudinally on either side of the cross-member.

For maximum effectiveness, one stiffener is arranged longitudinally in front of a cross-member, and another stiffener is arranged longitudinally behind the cross-member.

Depending on requirements, landing gear with two cross-members may thus possess one to four stiffeners.

Furthermore, at least one link end of the elongate link member is optionally hinged to a rocker via a ball joint.

The rockers of a stiffener are thus connected to each other via a link element of the elongate link member type. The elongate link member is linked via at least one ball joint to at least one rocker so as to transfer only traction/compression type forces to the elongate link member. Two ball joints may be used to connect the elongate link member respectively to the first rocker and to the second rocker of a stiffener.

Nevertheless, at least one link end of the elongate link member of a stiffener may optionally be hinged to a rocker via a pivot.

Furthermore, the elongate link member may comprise a link and/or also a damper. The damper of an elongate link member may for example and in non-limiting manner be a hydraulic damper, a damper that operates by friction, or a damper including an elastomer.

Furthermore, at least one rocker may present roll stiffness that is greater than the roll stiffness of the cross-member to which the rocker is secured.

Each rocker may be dimensioned to be as stiff as possible in order to optimize the operation of the invention tending to avoid deformation when loaded in roll.

For example, at least one rocker presents roll stiffness greater than the roll stiffness of a segment of the cross-member to which the rocker is secured. This segment may be a lateral zone of the central portion connected to a downwardly-extending branch, and/or may include a portion of a downwardly-extending branch.

In order to make the stiffener even more effective, a manufacturer may make the cross-member more flexible in its segments connected to a rocker. Such flexibility may optionally be obtained by modifying the thickness of the cross-member in the appropriate segments.

Furthermore, at least one rocker is secured to a segment of a cross-member both along an outer fastening direction and along an inner fastening direction, which fastening directions are transversely offset relative to each other.

A rocker may also be welded to the cross-member, or indeed it may be fastened to the cross-member via at least fastener point.

The solution involving welding may be advantageous since it makes it possible to go from at least two fastener points to fastening that is continuous. Welding may be simple welding, or it may be welding performed by so-called "stir welding".

Each rocker may also be connected to the cross-member via two fastener points, which constitutes a solution that is effective in picking up roll movements.

Fastening at two fastener points that are located respectively along an outer fastening direction and along an inner fastening direction presents the advantage of allowing the manufacturer a degree of freedom for adjusting the stiffness of the landing gear.

Thus, each rocker may be fastened to the cross-member by fastener means passing via an "outer" fastener point and fastener means passing via an "inner" fastener point. The two outer fastener points for the two rockers of a stiffener are then positioned transversely further out than the inner fastener points.

The positions of the outer fastener points serve mainly to adjust the spacing between the outer fastener points and consequently the roll stiffness of the landing gear. The positions of the inner fastener points serve mainly to adjust spacing between the inner fastener points and consequently the vertical stiffness of the landing gear under vertical loading.

The outer distance between the outer fastening points thus has an influence on stiffness in roll. Furthermore, the inner distance between the inner fastener points has an influence on vertical stiffness.

Under such circumstances, a fastener rod or the equivalent may link an outer fastener point of the rocker to the cross-member while extending along a direction referred to as the "outer fastener direction". Similarly, a fastener rod or the equivalent may link an inner fastener point of the rocker to the cross-member by extending along a "inner fastening direction".

Each fastening direction is optionally horizontal and passes through a neutral axis of the cross-member.

The term "neutral axis" is well known to the person skilled in the art. Nevertheless, it should be recalled that a neutral "axis" may represent a plane of the cross-member, with the material of the cross-member that is situated in this plane deforming in local rotation without being subjected to compression or traction stress as a results of the cross-member bending.

Consequently, fastener rods directed along the fastening directions may pass through the neutral axis of a cross-member so as to minimize the loading exerted on the cross-member.

Furthermore, each hinge means hinging a rocker to a carrier structure presents a hinge direction about which the rocker can pivot. This hinge direction may be arranged transversely between the outer fastening direction and the inner fastening direction of the rocker.

Furthermore, at least one rocker may comprise a plate that is offset longitudinally relative to the segment of the cross-member to which the rocker is secured.

In another variant, at least one rocker may include a tube, at least one bearing being interposed between the rocker and a segment of the cross-member to which the rocker is secured.

In a first embodiment, the cross-member is a continuous cross-member having a central portion extending between the first branch and the second branch. The stiffener extends parallel to said cross-member and comprising in succession in the transverse direction:

the first rocker which is longitudinally offset relative to the cross-member; and the second rocker which is longitudinally offset relative to the cross-member, and which is in line with the first rocker.

The first embodiment thus seeks to provide a stiffener that is arranged in parallel with a continuous cross-member for suspending the cross-member to an aircraft.

In a second embodiment, the cross-member is a discontinuous cross-member including an empty space between the first branch and the second branch. The stiffener extends in said space:

said first rocker is secured by said outer first end portion to the first branch and is situated in alignment with said first branch, said outer first end portion being hollow;

said second rocker is secured by said outer second end portion to the second branch and is situated in alignment with said second branch, said outer second end portion being hollow; and said stiffener includes an internal tube penetrating into the outer first end portion and into the outer second end portion, said internal tube being fastened to the outer first end portion and to the outer second end portion, said inner first end portion and said inner second end portion being longitudinally offset relative to said internal tube in order to be connected to the elongate link member.

This second embodiment proposes arranging each rocker in line with a downwardly-extending branch. A downwardly-extending branch and the corresponding rocker may optionally form a single mechanical part.

Furthermore, the internal tube may be considered as being the central portion of a continuous cross-member of the first embodiment. Under such circumstances, this second embodiment operates in a manner similar to the first embodiment.

In addition to landing gear, the invention provides an aircraft including the landing gear. More particularly, the aircraft may be an aircraft having at least one rotary wing.

BRIEF DESCRIPTION OF THE SEVERAL VIEWS OF THE DRAWINGS

The invention and its advantages appear in greater detail in the context of the following description of embodiments given by way of illustration and with reference to the accompanying figures, in which:

FIG. 9 is a diagram explaining the deformation of a cross-member in the presence of the invention in a first embodiment and under roll loading;

FIG. 10 is a diagram showing landing gear provided with two first embodiment stiffeners per cross-member;

FIG. 11 is a diagram showing an elongate link member of damper type; and

FIG. 12 is a diagram showing a second embodiment.

Elements present in more than one of the figures are given the same references in each of them.

DETAILED DESCRIPTION OF THE INVENTION

It should be observed that three mutually orthogonal directions X, Y, and Z are shown in some of the figures.

The first direction X is said to be longitudinal. The term "longitudinal" relates to any direction parallel to the first direction X.

The second direction Y is said to be transverse. The term "transverse" relates to any direction parallel to the second direction Y.

Finally, the third direction Z is said to be in elevation. The term "in elevation" or "vertical" relates to any direction parallel to the third direction Z.

Figure 1:
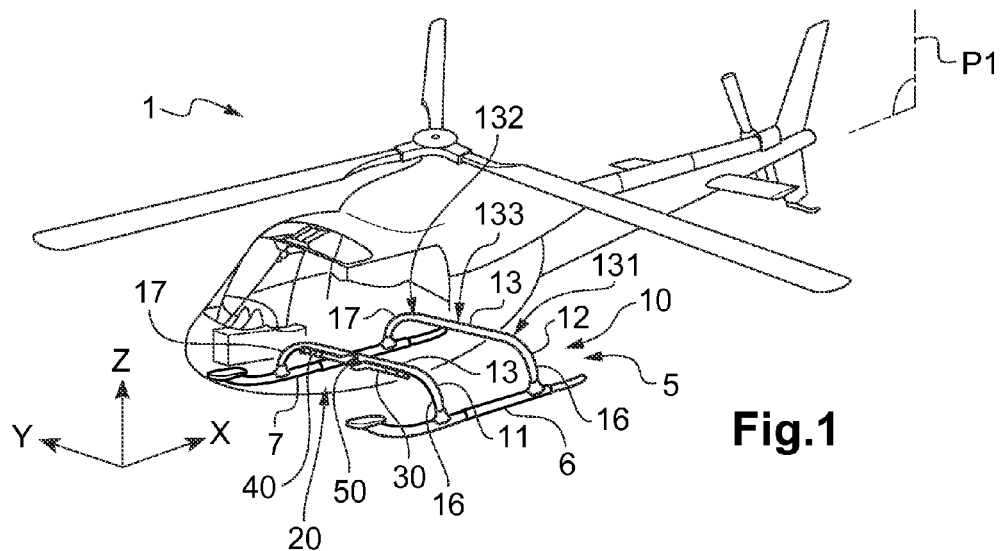
FIG. 1 is a diagram showing an aircraft of the invention.

FIG. 1 shows an aircraft 1, and more particularly a rotorcraft.

The aircraft 1 has a fuselage that extends longitudinally along an antero-posterior plane of symmetry P1. The fuselage is also secured to skid landing gear 5.

It should be observed that a portion of the fuselage is shown as being transparent in order to enable the landing gear 5 to be seen.

The landing gear 5 comprises a longitudinally-extending load-bearing first skid 6 and a longitudinally-extending load-bearing second skid 7.

Under such circumstances, the landing gear has two transverse cross-members 10 connecting the first skid 6 and the second skid 7 together, namely a front cross-member 11 and a rear cross-member 12.

Each cross-member 10 has a first branch 16 that is secured to the first skid 6 and a second branch 17 that is secured to the second skid 7.

Furthermore, in the first embodiment of FIG. 1, each cross-member is continuous and includes a central portion 13 secured to the first branch 16 and to the downwardly-directed second branch 17. The branches are sometimes referred to as "downwardly-directed" branches insofar as they extend from the central portion towards a skid and in so doing they come closer to the ground. Thus, each central portion 13 is substantially contained in a horizontal plane, with the downwardly-directed branches 16 and 17 extending from this horizontal plane towards the skids 6 and 7. Each central portion may correspond to a straight tube or it may possess a small amount of curvature.

Each central portion may be made up of a first lateral segment 131 connected to the first downwardly-directed branch, a second lateral segment 132 connected to the second downwardly-directed branch, and a central segment 133 interposed between the first lateral segment 131 and the second lateral segment 132, and crossing the antero-posterior plane P1.

In a second embodiment that is described below, the cross-member is a discontinuous cross-member.

Independently of the embodiment, the landing gear 5 is also connected to a carrier structure of the aircraft.

In the invention, the landing gear 5 has at least one stiffener 20 co-operating with a cross-member 10. In FIG. 1, only one stiffener 20 is shown diagrammatically placed against the front cross-member in order to avoid overcrowding the figure.

A stiffener then includes a first rocker 30 and a second rocker 40, each of which is connected in part to a cross-member via its outer end portions. The first rocker 30 and the second rocker 40 are also connected to each other in the proximity of the antero-posterior plane P1 by an elongate link member 50.

In the variant of FIG. 1, the elongate link member 50 is a simple link. In the variant of FIG. 11, the elongate link member is a damper. These two embodiments are mutually compatible.

In the first embodiment, each rocker 30, 40 of a stiffener is offset longitudinally from its cross-member, i.e. it is offset in the longitudinal direction X.

With reference to FIG. 10, each cross-member may have at least one stiffener 20. Optionally, at least one cross-member may be fitted with two stiffeners 20 disposed longitudinally on either side of the cross-member.

Figure 2:
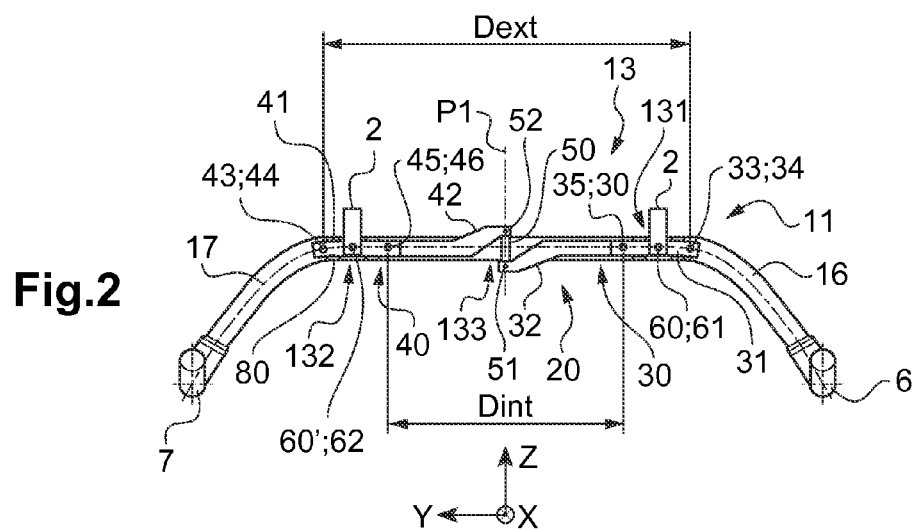
FIG. 2 is a front view showing a stiffener in a first embodiment of the invention.

FIG. 2 shows a first embodiment of a cross-member 20 in front view.

This stiffener thus has a first rocker extending transversely from an outer first end portion 31 towards an inner first end portion 32, in a direction going from the first skid 6 towards the antero-posterior plane P1.

The outer first end portion 31 is secured to the cross-member, and in particular to a first lateral segment 131 of the central portion 13. Conventional fastener means 34, 36 may be used for fastening the outer first end portion 31 to the cross-member, such as fastener rods of the bolt type, for example.

The first rocker 30 may be secured to a first lateral segment 131 of a cross-member via a fastener point constituted by welding, for example, or indeed it may be secured via at least two fastener points.

Under such circumstances, the first rocker may be fastened to the first lateral segment 131 along an outer first fastening direction 33 and along an inner first fastening direction 35, which directions are offset transversely relative to each other. Each first fastening direction 33, 35 is horizontal so as to pass through a neutral axis of the cross-member. Thus, two fastener means 34 and 36 extend along the outer first fastening direction 33 and along the inner first fastening direction 35 in order to pass through the cross-member at its neutral axis.

Conversely, the inner first end portion 32 is free, i.e. it is not secured directly to the cross-member. This inner first end portion 32 thus faces a central segment 133 of the central portion 13 of the cross-member.

The term "outer end portion" thus designates a segment of a rocker that is fastened to a cross-member, while the term "inner end portion" designates the segment of the rocker that is not fastened to the cross-member.

Furthermore, the stiffener includes first hinge means 61 for hinging the first rocker to a carrier structure 2. The first hinge means 61 define a first hinge direction 60 about which the first rocker 30 can pivot. To this end, the first hinge means may comprise a pivot pin extending along the hinge direction 60. This first hinge direction 60 extends longitudinally, and is arranged transversely between the outer first fastening direction 33 and the inner first fastening direction 35 of the first rocker 30 as shown.

Furthermore, the stiffener includes a second rocker 40. The second rocker 40 extends transversely from an outer second end portion 41 towards an inner second end portion 42 in a direction going from the second skid 7 towards the antero-posterior plane P1.

The outer second end portion 41 is secured to the cross-member, and in particular to a second lateral segment 132 of the central portion. Conventional fastener means 44 and 46 may be used for fastening the outer second end portion 41 to the cross-member, such as fastener rods of the bolt type, for example.

The second rocker 40 may be secured to a segment of a cross-member via at least one fastener point, and in particular via two fastener points.

Under such circumstances, the second rocker may be fastened to this segment via an outer second fastening direction 43 and an inner second fastening direction 45 which are transversely offset from each other. These second fastening directions 43 and 45 are horizontal to pass through the neutral axis of the cross-member. Thus, two fastener means 44 and 46 extend along the outer second fastening direction 43 and along the second inner fastening direction 45 so as to penetrate into the cross-member at its neutral axis.

Conversely, the inner second end portion 42 is free, since it is not secured to the cross-member. This inner second end portion 42 thus faces a central segment 133 of the central portion 13 of the cross-member.

Furthermore, the stiffener has second hinge means 62 for hinging the second rocker to the carrier structure 2. The second hinge means 62 define a second hinge direction 60' about which the second rocker 40 can pivot. To this end, the second hinge means may comprise a pivot pin directed along the second hinge direction 60'. This second hinge direction 60' extends longitudinally, and it is arranged transversely between the outer second fastening direction 43 and the inner second fastening direction 45 of the second rocker 40 as shown.

Furthermore, the stiffener includes an elongate link member 50.

The elongate link member 50 extends in elevation from a first link end 51 hinged to the inner first end portion 32 of the first rocker 30 towards a second link end 52 hinged to the inner second end portion 42 of the second rocker 40.

More precisely, in flight, the elongate link member 50 lies substantially in the longitudinal antero-posterior plane of symmetry P1 of the landing gear.

Under such circumstances, each link end 51, 52 of the elongate link member 50 may be hinged to the corresponding rocker 30 via a ball joint or a pivot.

In a transverse direction Y and going from the first skid 6 towards the second skid 7, the stiffener 20 thus has the outer first end portion 31, the inner first end portion 32, the elongate link member, the inner second end portion 42, and then the outer second end portion 41.

In the variant of the first embodiment shown diagrammatically in FIG. 2, a rocker 30, 40 may comprise a tube extending transversely. At least one bearing 80 may be interposed for example between the rocker 30, 40 and the segment of the cross-member to which the rocker is secured.

Figure 3:
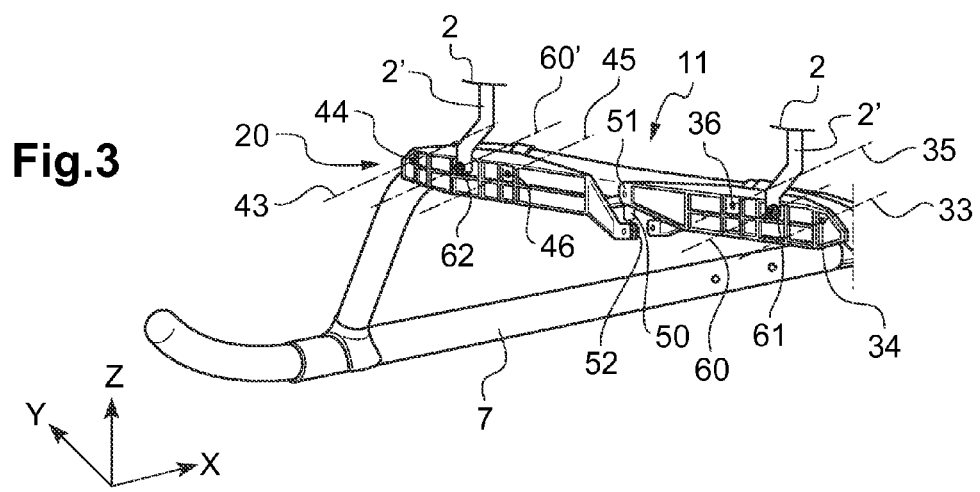
FIG. 3 is a three-dimensional view showing a stiffener in a first embodiment of the invention.

In the variant of the first embodiment shown diagrammatically in FIG. 3, a rocker 30, 40 comprises a plate that is offset longitudinally relative to the cross-member.

Furthermore, and independently of the variant, each rocker may be dimensioned to present optimized stiffness in roll.

In particular, the stiffness in roll of a rocker may be greater than the stiffness of roll of the cross-member connected to that rocker, or more specifically to the stiffness in roll of the segment of the cross-member that is attached to that rocker.

Likewise, the points where each rocker is fastened to a cross-member are located geometrically as a function of the expected results.

With reference to FIG. 2, the adjustment of the distance Dext representing the spacing between the outer fastener points has an impact in particular on the stiffness in roll of the landing gear, whereas the adjustment to the distance Dint representing the spacing between the inner fastener points has an impact in particular on the stiffness of the landing gear under a vertical load.

FIGS. 4 to 9 show the operation of the invention in the first embodiment.

Figure 4:
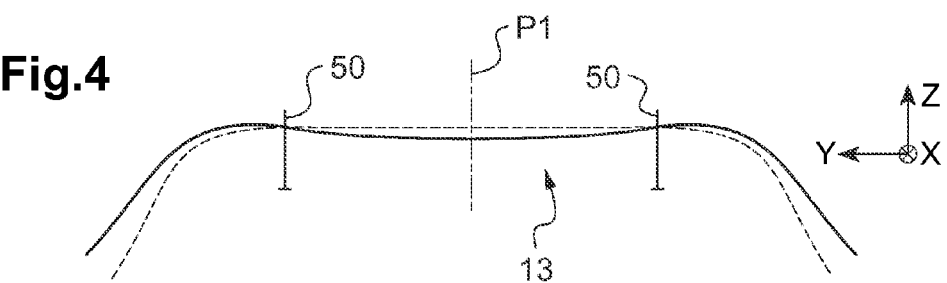
FIG. 4 is a diagram explaining the deformation of a continuous cross-member in the absence of the invention and under vertical loading.

In FIG. 4, a dashed line shows a cross-member in flight while a continuous line shows the deformation of a cross-member in the absence of the invention and under the effect of a vertical load.

While landing, the cross-member is loaded in a vertical first bending mode. The central portion then tends to take on a flat U-shape.

Figure 5:
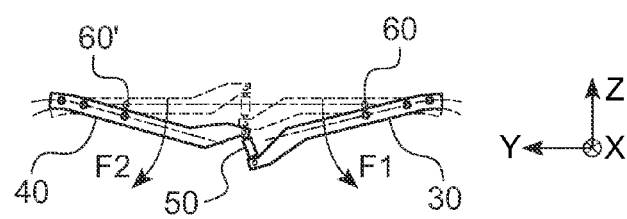
FIG. 5 is a diagram explaining the operation of a stiffener in a first embodiment under vertical loading.

In FIG. 5, the first rocker 30 and the second rocker 40 pivot in symmetrical directions as represented by arrows F1 and F2.

These pivoting movements of the rockers are made possible by the elongate link member 50 also moving.

Figure 6:
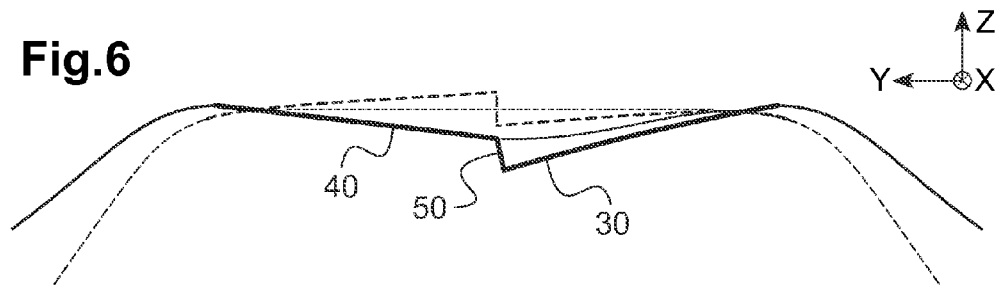
FIG. 6 is a diagram explanation the deformation of a cross-member in the presence of the invention in a first embodiment and under vertical loading.

With reference to FIG. 6, the stiffness then has limited influence on the deformation of the cross-member under a vertical load. When performing a level landing, there is thus no force on the elongate link member 50.

Figure 7:
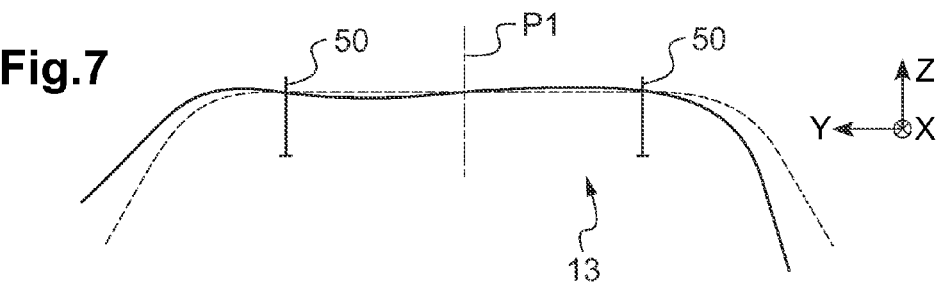
FIG. 7 is a diagram explaining the deformation of a continuous cross-member in the absence of the invention under roll loading.

In contrast, FIG. 7 uses a dashed line to show a cross-member in flight, and a continuous line to show the deformation of a cross-member while loaded on the ground with the rotor turning so as to be in a second bending mode in roll.

In this mode of deformation, the central portion tends to take on an S-shape, presenting two lobes on either side of the plane of symmetry P1.

Figure 8:
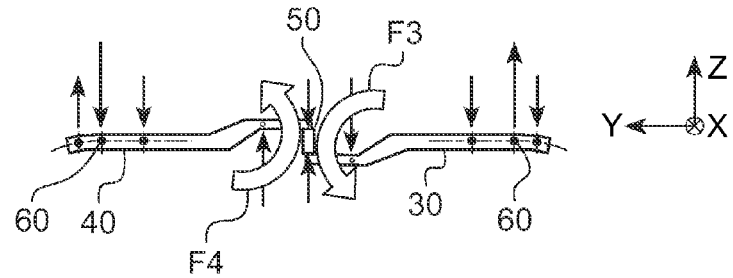
FIG. 8 is a diagram explaining the operation of a stiffener in a first embodiment under roll loading.

With reference to FIG. 8, the first rocker 30 and the second rocker 40 both tend to pivot in identical directions as represented by arrows F3 and F4. Such pivoting movements of the rockers are nevertheless prevented because of the presence of the elongate link member 50. The elongate link member is then loaded in traction or in compression and prevents the rockers from performing their opposing pivoting movements.

With reference to FIG. 9, the stiffener then has a major influence on the deformation of the cross-member under the effect of loading in roll, the stiffener tending to prevent or at least limit any deformation of the cross-member under such conditions.

FIG. 12 shows a second embodiment.

In the first embodiment, the cross-member is a continuous cross-member. The first rocker 30 is thus offset longitudinally relative to the cross-member, the second rocker 40 being offset longitudinally relative to the cross-member while being in alignment with the first rocker.

In the second embodiment shown in FIG. 12, the cross-member is a discontinuous cross-member that does not have a central portion. The cross-member thus has an empty space between the first branch and the second branch.

Under such circumstances, the stiffener 20 extends in this space.

The first rocker 30 is attached via its outer first end portion 31 to the first branch, being arranged to lie in continuity with the first branch. For example, the end of the first branch is welded to an end of the first rocker. In another approach, the first branch and the first rocker form a single piece.

Likewise, the second rocker 40 is secured via its outer second end portion 41 to the second branch and is arranged to lie in continuity with the second branch.

Furthermore, the stiffener has an internal tube 70 that can be considered as being the central portion of a continuous cross-member.

Consequently, the outer first end portion 31 and the outer second end portion 41 are hollow in order to receive the internal tube.

The internal tube thus penetrates into the outer first end portion 31 and into the outer second end portion 41 in order to be fastened to those outer end portions. Bearings may be arranged between the internal tube and each outer end portion 31, 41.

For example, the means for fastening the internal tube to a rocker and the means for hinging the rockers to a structure may be of the type described in the context of the first embodiment.

In the example of FIG. 12, the internal tube 70 may be fastened to each of the rockers along two fastening directions. Two fastener means 34 & 36 or 44 & 46 per rocker extend respectively along outer fastening directions 33 and 43 and along inner fastening directions 35 and 45 in order to penetrate into the internal tube, possibly via its neutral axis. In accordance with the first embodiment, this example provides potential for adjustment in setting the distance Dext representing the spacing between the outer fastener points and the distance Dint representing the spacing between the inner fastener points.

Furthermore, the stiffener may have one pivot pin per rocker extending along a hinge direction 60, 60'. Each hinge direction 60, 60' extends longitudinally and is arranged transversely between the corresponding outer fastening direction 33, 43 and inner fastening direction 35, 45.

Furthermore, the inner first end portion 32 and the inner second end portion 42 are longitudinally offset relative to the internal tube in order to be connected to the elongate link member 50.

The operation of this second embodiment is similar to the operation of the above-described first embodiment, considering the internal tube in the second embodiment as being equivalent to the central portion of the first embodiment.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A landing gear for an aircraft, the landing gear having a longitudinally-extending load-bearing first skid and a longitudinally-extending load-bearing second skid together with a cross-member referred to as a front cross-member and a cross-member referred to as a rear cross-member, each cross-member connecting the first skid to the second skid, each cross-member having a first downwardly-directed branch secured to the first skid, and a second downwardly-directed branch secured to the second skid;

wherein the landing gear includes at least one stiffener arranged on a cross-member, said stiffener comprising in succession in a transverse direction:

a first rocker extending from an outer first end portion secured to the cross-member and going towards an inner first end portion that is free;

a second rocker extending from an inner second end portion that is free towards an outer second end portion secured to said cross-member;

first hinge means for hinging the first rocker to a carrier structure of an aircraft, and second hinge means for hinging the second rocker to said carrier structure; and an elongate link member extending from a first link end hinged to said inner first end portion of the first rocker to a second link end hinged to said inner second end portion of the second rocker.

2. The landing gear according to claim 1, wherein each rocker is longitudinally offset relative to the cross-member.

3. The landing gear according to claim 1, wherein each cross-member has at least one stiffener.

4. The landing gear according to claim 1, wherein at least one cross-member is fitted with two stiffeners arranged longitudinally on either side of the cross-member.

5. The landing gear according to claim 1, wherein at least one link end of the elongate link member is hinged to a rocker via at least one ball joint.

6. The landing gear according to claim 1, wherein at least one link end of said elongate link member is hinged to a rocker via a pivot.

7. The landing gear according to claim 1, wherein at least one rocker presents roll stiffness that is greater than the roll stiffness of the cross-member to which the rocker is secured.

8. The landing gear according to claim 1, wherein at least one rocker presents roll stiffness greater than the roll stiffness of a segment of the cross-member to which the rocker is secured.

9. The landing gear according to claim 1, wherein at least one rocker is secured to a segment of a cross-member along an outer fastening direction and along an inner fastening direction, which inner and outer fastening directions are transversely offset relative to each other.

10. The landing gear according to claim 9, wherein each fastening direction is horizontal and passes through a neutral axis of the cross-member.

11. The landing gear according to claim 9, wherein each hinge means of a rocker presents a hinge direction about which a rocker can pivot, said hinge direction being arranged transversely between the outer fastening direction and the inner fastening direction of the rocker.

12. The landing gear according to claim 1, wherein at least one rocker comprises a plate that is longitudinally offset relative to a segment of the cross-member to which the rocker is secured.

13. The landing gear according to claim 1, wherein at least one rocker includes a tube, at least one bearing being interposed between the rocker and a segment of the cross-member to which the rocker is secured.

14. The landing gear according to claim 1, wherein the elongate link member of a stiffener extends in flight in an elevation direction contained in a longitudinal antero-posterior plane of symmetry of the landing gear.

15. The landing gear according to claim 1, wherein the elongate link member comprises a link and/or a damper.

16. The landing gear according to claim 1, wherein said cross-member is a continuous cross-member having a central portion extending between the first branch and the second branch, said stiffener extending parallel to said cross-member and comprising in succession in said transverse direction:

said first rocker which is longitudinally offset relative to the cross-member; and said second rocker which is longitudinally offset relative to the cross-member, and which is in line with the first rocker.

17. The landing gear according to claim 1, wherein said cross-member is a discontinuous cross-member including an empty space between the first branch and the second branch, and said stiffener extends in said space:

said first rocker is secured by said outer first end portion to the first branch and is situated in alignment with said first branch, said outer first end portion being hollow;

said second rocker is secured by said outer second end portion to the second branch and is situated in alignment with said second branch, said outer second end portion being hollow; and said stiffener includes an internal tube penetrating into the outer first end portion and into the outer second end portion, said internal tube being fastened to the outer first end portion and to the outer second end portion, said inner first end portion and said inner second end portion being longitudinally offset relative to said internal tube in order to be connected to the elongate link member.

18. An aircraft, including landing gear according to claim 1.

* * * * *